United States Patent
Yang et al.

(10) Patent No.: US 11,067,845 B2
(45) Date of Patent: Jul. 20, 2021

(54) LIQUID CRYSTAL PANEL AND METHOD OF MANUFACTURING SAME

(71) Applicant: Wuhan China Star Optoelectronics Technology Co., Ltd., Hubei (CN)

(72) Inventors: Chaoqun Yang, Hubei (CN); Changchih Huang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 47 days.

(21) Appl. No.: 16/497,631

(22) PCT Filed: Dec. 15, 2018

(86) PCT No.: PCT/CN2018/121356
§ 371 (c)(1),
(2) Date: Sep. 25, 2019

(87) PCT Pub. No.: WO2020/087682
PCT Pub. Date: May 7, 2020

(65) Prior Publication Data
US 2020/0409209 A1  Dec. 31, 2020

(30) Foreign Application Priority Data
Oct. 30, 2018 (CN) .......... 201811279025.4

(51) Int. Cl.
*G02F 1/1339* (2006.01)
*G02F 1/1335* (2006.01)
*G02F 1/017* (2006.01)

(52) U.S. Cl.
CPC ........ *G02F 1/133514* (2013.01); *G02F 1/017* (2013.01); *G02F 1/1339* (2013.01);
(Continued)

(58) Field of Classification Search
CPC ........ G02F 1/133514; G02F 1/133528; G02F 1/017; G02F 1/1339; G02F 2001/133548; G02F 2001/01791
See application file for complete search history.

(56) References Cited

U.S. PATENT DOCUMENTS 9,164,307 B2 * 10/2015 Kumai ................. G02F 1/1335
9,599,869 B2 * 3/2017 Park .................. G02F 1/136286
(Continued)

*Primary Examiner* — Hoan C Nguyen
(74) *Attorney, Agent, or Firm* — Hamre, Schumann, Mueller & Larson, P.C.

(57) ABSTRACT

A liquid crystal panel and a method manufacturing the same are provided. The liquid crystal panel including a color filter substrate, an array substrate disposed opposite to the color filter substrate and a built-in polarizer. The built-in polarizer includes a substrate, a first inorganic layer, a metal wire grid layer, and a second inorganic layer. The substrate covers a side of the color filter substrate facing the array substrate. The first inorganic layer covers the substrate. The metal wire grid layer covers the first inorganic layer, wherein the metal wire grid layer has a plurality of metal wires parallel to each other. The second inorganic layer has a plurality of inorganic wires parallel to each other, wherein each of the inorganic wires correspondingly covers one of the metal wires.

8 Claims, 4 Drawing Sheets

(52) U.S. Cl.
CPC .... *G02F 1/133528* (2013.01); *G02F 1/01791* (2021.01); *G02F 1/133548* (2021.01)

(56) References Cited

U.S. PATENT DOCUMENTS

| | | | |
|---|---|---|---|
| 10,156,668 B2* | 12/2018 | Takakuwa | G02B 5/3058 |
| 2012/0287507 A1* | 11/2012 | Lee | B82Y 10/00 |
| | | | 359/492.01 |
| 2015/0002791 A1* | 1/2015 | Nam | G02B 5/3058 |
| | | | 349/96 |
| 2016/0272791 A1* | 9/2016 | Takakuwa | G03F 7/027 |
| 2016/0327719 A1* | 11/2016 | Kitahara | G02B 6/005 |
| 2018/0267221 A1* | 9/2018 | Oowada | G02F 1/1335 |
| 2018/0341147 A1* | 11/2018 | Sugitani | G02F 1/13439 |
| 2020/0409209 A1* | 12/2020 | Yang | G02F 1/1339 |

* cited by examiner

LIQUID CRYSTAL PANEL AND METHOD OF MANUFACTURING SAME

FIELD OF INVENTION

The present disclosure relates to display device technologies, and more particularly, to a liquid crystal panel and a method of manufacturing the same.

BACKGROUND OF INVENTION

Thin film transistor liquid crystal displays (TFT-LCDs) have been rapidly developed and widely used in recent years. Most liquid crystal display devices on the market are backlight type liquid crystal display devices, which include a liquid crystal display panel and a backlight module. Generally, a liquid crystal display panel is composed of a color filter (CF) substrate, a thin film transistor (TFT) substrate, a liquid crystal (LC) sandwiched between the color filter substrate and the thin film transistor substrate, and a sealant. The working principle is controlling a rotation of liquid crystal molecules of a liquid crystal layer by applying a driving voltage on two glass substrates, and refracting light beams of the backlight module to produce an image.

With a pursuit of a better user experience for display panels, development and production of higher color gamut and higher brightness displays have become a goal of various panel manufacturers. Quantum dot-based backlight technology that has been mass-produced now enables the LCDs to achieve 110% NTSC (National Television System Committee) color gamut. It is much higher than 90%-100% NTSC color gamut of traditional LCD displays. A direct application of quantum dots to a color film substrate can further enhance the color gamut to more than 90% BT2020. Both color gamut and color purity are superior to existing organic light emitting diode (OLED) display panels. However, since quantum dot materials are self-luminous materials, light emitted therefrom cannot be turned on or off even if a polarizer is attached to an outside of a liquid crystal panel.

In existing solutions, a method for providing a wire grid polarizer in a color film substrate by nanoimprint technology is also proposed to solve a current problem that a quantum dot color film substrate cannot perform light on and off. However, in actual processes, there are still some difficulties. In general, in a process of a nanoimprinted polarizer, there are certain requirements about a height of a metal wire in a metal wire grid and a spacing between the metal wires. Therefore, it requires that a substrate layer must be sufficiently flat before nanoimprinting. An existing process of a nanoimprinted metal wire grid is arranged after a photo lithography process for fabricating the color filter substrate, but it is very difficult for flatness, after the photo lithography process, to reach a nanometer level.

Therefore, there is a need for a liquid crystal panel and a method of manufacturing the same to solve the above problems.

SUMMARY OF INVENTION

In view of the above, the present disclosure provides liquid crystal panel and a method of manufacturing the same to resolve above-mentioned technical problem. The present disclosure ensures a flatness of a substrate before nanoimprinting by adding a thinning substrate. It reduces the difficulty of a nanoimprinting process. The present disclosure provides a built-in polarizer before a process of providing a color filter substrate so as to reduce the difficulty of processes.

In order to achieve above-mentioned object of the present disclosure, one embodiment of the disclosure provides a liquid crystal panel including a color filter substrate, an array substrate disposed opposite to the color filter substrate and a built-in polarizer. The built-in polarizer includes a substrate, a first inorganic layer, a metal wire grid layer, and a second inorganic layer. The substrate covers a side of the color filter substrate facing the array substrate. The first inorganic layer covers the substrate. The metal wire grid layer covers the first inorganic layer, wherein the metal wire grid layer has a plurality of metal wires parallel to each other. The second inorganic layer has a plurality of inorganic wires parallel to each other, wherein each of the inorganic wires correspondingly covers one of the metal wires.

In one embodiment of the disclosure, the substrate is made of polyimide or glass, and the substrate has a thickness from 0.1 mm to 1 mm.

In one embodiment of the disclosure, the color filter substrate includes a quantum dot color filter, and an encapsulation layer. The quantum dot color filter is disposed on a side of the substrate opposite another side of the substrate facing the first inorganic layer. The encapsulation layer covers the quantum dot color filter, wherein transmittance to water vapor and oxygen of the encapsulation layer is less than $1 \times 10^{-2}$.

In one embodiment of the disclosure, the liquid crystal panel further includes a liquid crystal layer disposed between the array substrate and the color filter substrate, and a spacer layer disposed on a side of the built-in polarizer facing the array substrate.

In one embodiment of the disclosure, a height of the metal wire grid layer is from 180 nm to 250 nm, and a pitch between adjacent two of the metal wires is from 60 nm to 80 nm.

In one embodiment of the disclosure, material of the metal wire grid layer includes at least one of aluminum, copper, silver, chromium, gold, and nickel. Material of the first inorganic layer and the second inorganic layer comprises at least one of silicon oxide, silicon nitride, aluminum oxide, silicon oxynitride, and hafnium oxide, respectively.

Furthermore, another embodiment of the disclosure provides a method of manufacturing a liquid crystal panel, including steps of:

providing a built-in polarizer;

providing an array substrate and assembling the array substrate and the built-in polarizer; and providing a color filter substrate disposed on the substrate of the built-in polarizer.

The step of providing a built-in polarizer includes steps of:

providing a substrate;

depositing a first inorganic layer on one side of the substrate;

depositing a metal wire grid layer on the first inorganic layer;

depositing a second inorganic layer on the metal wire grid layer, wherein the second inorganic layer faces the array substrate;

coating a photoresist layer on the second inorganic layer;

providing a nanoimprint template;

nanoimprinting the photoresist layer by the nanoimprint template to obtain a photoresist pattern from the photoresist layer, wherein the photoresist pattern has a plurality of photoresist strips arranged side by side;

etching the second inorganic layer and the metal wire grid layer by taking the photoresist pattern as a shielding layer to form a plurality of metal wires arranged side by side in the metal wire grid layer and form a plurality of inorganic wires arranged side by side in the second inorganic layer corresponding to the plurality of photoresist strips respectively; and removing the photoresist pattern, wherein the substrate, the metal wire grid layer, and the first inorganic protective layer and the second inorganic protective layer disposed on opposite sides of the metal wire grid layer are together to form the built-in polarizer.

In one embodiment of the disclosure, the step of providing the built-in polarizer further includes a step of thinning the substrate so that the thickness of the substrate is between 0.1 mm and 1 mm.

In one embodiment of the disclosure, the step of assembling the array substrate and the built-in polarizer includes a step of forming a spacer layer on a side of the second inorganic layer facing the array substrate.

In one embodiment of the disclosure, the step of providing the color filter substrate includes steps of:

forming a quantum dot color filter on a side of the substrate opposite another side of the substrate facing the first inorganic layer; and forming an encapsulation layer on the quantum dot color filter, wherein transmittance to water vapor and oxygen of the encapsulation layer is less than $1 \times 10^{-2}$. After the step of providing the color filter substrate, the method of manufacturing a liquid crystal panel further includes steps of:

filling liquid crystal between the color filter substrate and the array substrate to form a liquid crystal layer; and providing a quantum dot color filter disposed on a side of the substrate opposite another side of the substrate facing the first inorganic layer.

In comparison with prior art, the liquid crystal panel and the method of manufacturing the same of the disclosure reduce the difficulty of nanoimprinting by adding a glass substrate or a polyimide substrate and providing a metal wire grid layer on the substrate to form a built-in polarizer. The disclosure changes the position of built-in polarizer in the liquid crystal panel in prior art and provides a color filter substrate on a substrate of the built-in polarizer. The disclosure reduces the difficulty of processes by providing the built-in polarizer before providing the color filter substrate. The disclosure solves a problem that light beams from a quantum dot color film substrate cannot control to perform light on and off.

Reference numbers of the disclosure are as follow:

1: liquid crystal panel, 10: color filter substrate, 20: built-in polarizer, 30: liquid crystal layer, 40: spacer layer, 50: array substrate, 110: black matrix layer, 120: quantum dot color filter, 130: encapsulation layer, 210: substrate, 220: first inorganic layer, 230: metal wire grid layer, 240: second inorganic layer, 231: metal wire, 241: inorganic wire, 6: photoresistor layer, 60: patterning photoresistor, 610: photoresistor strip, and 7: nanoimprint template.

DETAILED DESCRIPTION OF PREFERRED EMBODIMENTS

The following description of the embodiments is provided by reference to the following drawings and illustrates the specific embodiments of the present disclosure. Directional terms mentioned in the present disclosure, such as "up," "down," "top," "bottom," "forward," "backward," "left," "right," "inside," "outside," "side," "peripheral," "central," "horizontal," "peripheral," "vertical," "longitudinal," "axial," "radial," "uppermost" or "lowermost," etc., are merely indicated the direction of the drawings. Therefore, the directional terms are used for illustrating and understanding of the application rather than limiting thereof.

Figure 1:
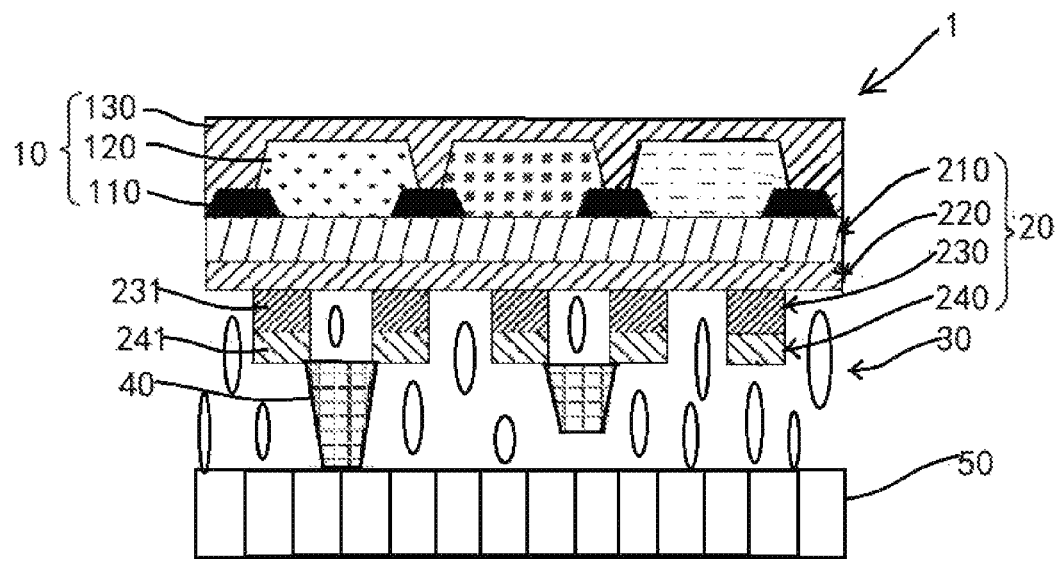
FIG. 1 is a schematic view of a structure of a liquid crystal panel according to an embodiment of the disclosure.
Figure 2:
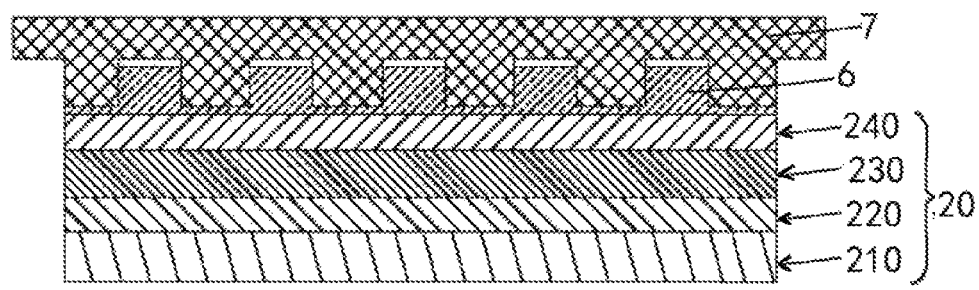
FIG. 2 is a schematic cross-sectional view of a structure of a built-in polarizer according to an embodiment of the disclosure corresponding to one of the manufacturing processes of the built-in polarizer.
Figure 3:
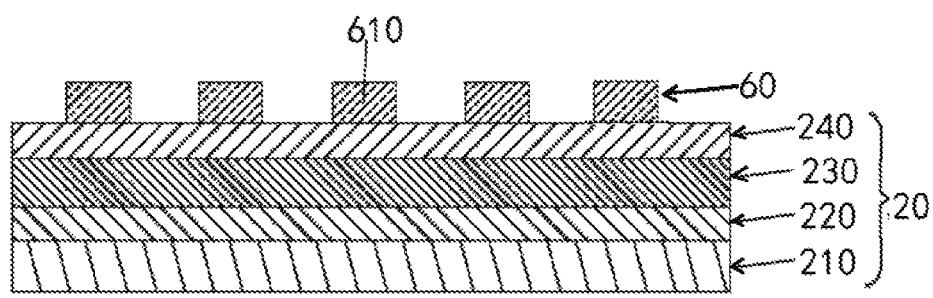
FIG. 3 is a schematic cross-sectional view of a structure of a built-in polarizer according to an embodiment of the disclosure corresponding to one of the manufacturing processes of the built-in polarizer.
Figure 4:
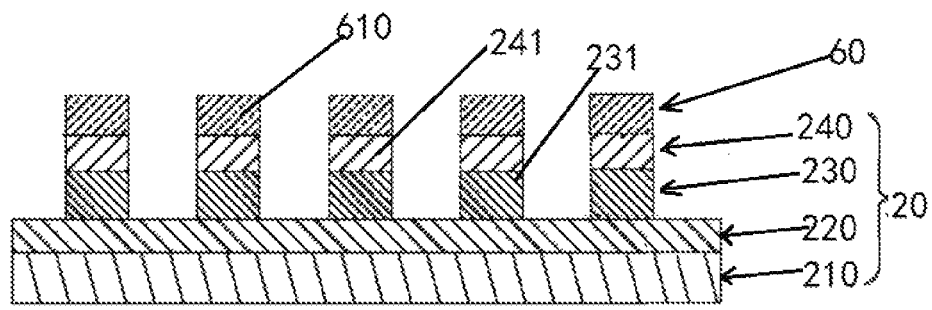
FIG. 4 is a schematic cross-sectional view of a structure of a built-in polarizer according to an embodiment of the disclosure corresponding to one of the manufacturing processes of the built-in polarizer.

Referring to FIG. 1, one embodiment of the present disclosure provides a liquid crystal panel 1 including a color filter substrate 10, a built-in polarizer 20, a liquid crystal layer 30, a spacer layer 40, and an array substrate 50. The color filter substrate 10 disposed opposite to the array substrate 50.

Figure 5:
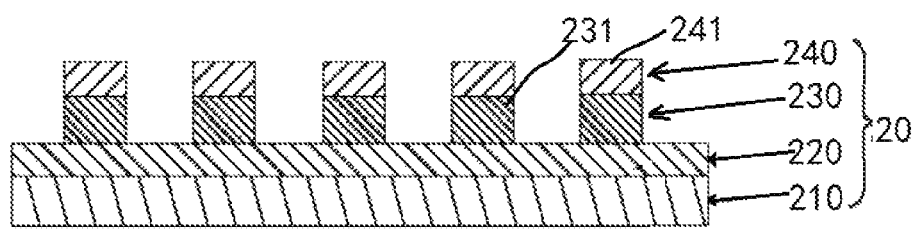
FIG. 5 is a schematic cross-sectional view of a structure of a built-in polarizer according to an embodiment of the disclosure corresponding to one of the manufacturing processes of the built-in polarizer.
Figure 6:
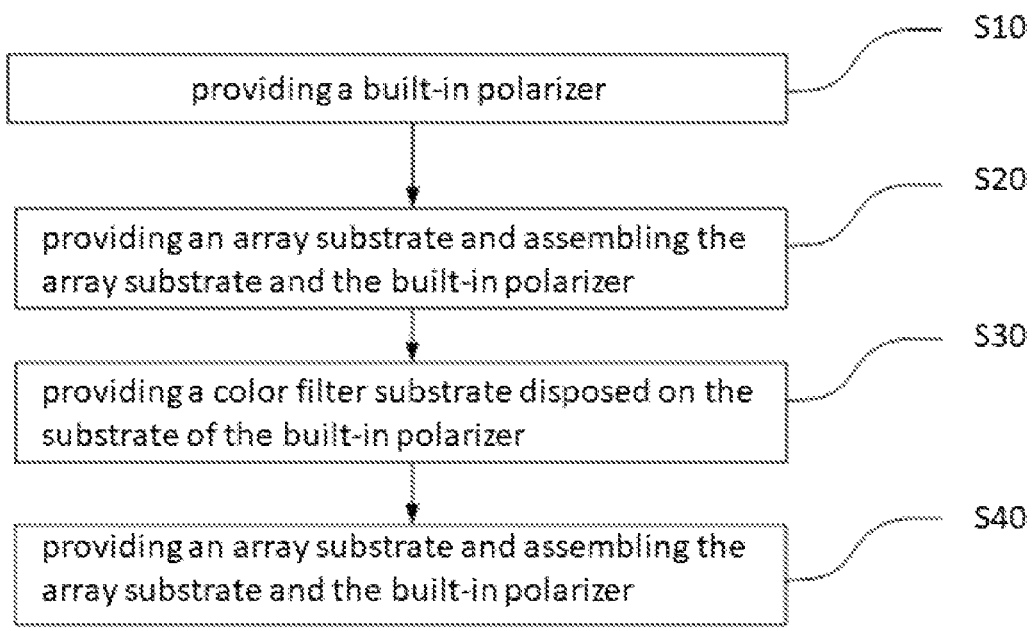
FIG. 6 is a schematic view of a flow chart of a method of manufacturing a liquid crystal panel according to an embodiment of the disclosure.

Referring to FIG. 5, the built-in polarizer 20 includes a substrate 210, a first inorganic layer 220, a metal wire grid layer 230, and a second inorganic layer 240.

Material of the substrate 210 is polyimide or glass. The substrate 210 is a polyimide substrate or a glass substrate. A thickness of the substrate 210 is from 0.1 mm to 1 mm.

The first inorganic layer 220 covers the substrate 210. Material of the first inorganic layer 220 includes at least one of silicon oxide, silicon nitride, aluminum oxide, silicon oxynitride, and hafnium oxide. In the embodiment of the present disclosure, material of the first inorganic layer 220 is silicon oxide.

The metal wire grid layer 230 covers the first inorganic layer 220, wherein the metal wire grid layer 230 has a plurality of metal wires 231 parallel to each other. Material of the metal wire grid layer 230 includes at least one of aluminum, copper, silver, chromium, gold, and nickel. In the embodiment of the present disclosure, material of the metal wire grid layer 230 is aluminum. A height of the metal wire grid layer 230 is from 180 nm to 250 nm, and a pitch between adjacent two of the metal wires 231 is from 60 nm to 80 nm.

The second inorganic layer 240 has a plurality of inorganic wires 241 parallel to each other, wherein each of the inorganic wires 241 correspondingly covers one of the metal wires 231. Material of the second inorganic layer 240 includes at least one of silicon oxide, silicon nitride, aluminum oxide, silicon oxynitride, and hafnium oxide. In the embodiment of the present disclosure, material of the second inorganic layer 240 is silicon oxide.

The liquid crystal layer 30 is disposed between the array substrate 50 and the color filter substrate 10. A spacer layer 40 is disposed on a side of the built-in polarizer 20 facing the array substrate 50.

The color filter substrate 10 is disposed on a side of the substrate 210 opposite another side of the substrate 210 facing the array substrate 50. The color filter substrate 10 includes a black matrix layer 110, a quantum dot color filter 120, and an encapsulation layer 130. The quantum dot color filter 120 and the black matrix layer 110 are disposed on a side of the substrate 210 opposite another side of the substrate 210 facing the first inorganic layer 220. The encapsulation layer 130 covers the quantum dot color filter 120, wherein transmittance to water vapor and oxygen of the encapsulation layer 130 is less than $1 \times 10^{-2}$. At the same time, the encapsulation layer 130 has a certain hardness to protect the quantum dot color filter 120. Generally, material used for the encapsulation layer 130 may be polyvinylpyrrolidone or polymethyl methacrylate, and a thickness thereof is 0.5 μm or more.

In general, a common array substrate includes a barrier layer, an active layer, a first gate insulating layer, a first gate layer, a second gate insulating layer, a second gate layer, a dielectric layer, an anode, a pixel defining layer, a luminescent layer, and the like in order from top to bottom. The main improvement of the present invention lies in the built-in polarizer and a positional structure of the built-in polarizer, the color film substrate, and the array substrate. Specifically, the color film substrate is directly fabricated on the structure of the built-in polarizer, and therefore, a structure of the array substrate will not discuss one by one.

Furthermore, referring to FIG. 5, another embodiment of the present disclosure provides a method of manufacturing a liquid crystal panel 1 including steps S10 to S40.

Referring to FIG. 7 or 8, and 2 to 5, step S10 is providing a built-in polarizer. Step S10 includes steps S101 to S107 and S110. Step S101 is providing a substrate 210. Material of the substrate 210 is polyimide or glass. The substrate 210 is a polyimide substrate or a glass substrate. A thickness of the substrate 210 is from 0.1 mm to 1 mm. Step S102 is depositing a first inorganic layer 220 on one side of the substrate 210. Material of the first inorganic layer 220 includes at least one of silicon oxide, silicon nitride, aluminum oxide, silicon oxynitride, and hafnium oxide. In the embodiment of the present disclosure, material of the first inorganic layer 220 is silicon oxide. Step S103 is depositing a metal wire grid layer 230 on the first inorganic layer 220. Material of the metal wire grid layer 230 includes at least one of aluminum, copper, silver, chromium, gold, and nickel. In the embodiment of the disclosure, material of the metal wire grid layer 230 is aluminum. Step S104 is depositing a second inorganic layer 240 on the metal wire grid layer 230. Material of the second inorganic layer 240 includes at least one of silicon oxide, silicon nitride, aluminum oxide, silicon oxynitride, and hafnium oxide. In the embodiment of the present disclosure, material of the second inorganic layer 240 is silicon oxide. Step S105 is coating a photoresist layer 6 on the second inorganic layer 240; Step S106 is providing a nanoimprint template 7 and nanoimprinting the photoresist layer 6 by the nanoimprint template 7 to obtain a photoresist pattern 60 from the photoresist layer 6, wherein the photoresist pattern 60 has a plurality of photoresist strips 610 arranged side by side. Step S107 is etching the second inorganic layer 240 and the metal wire grid layer 230 by taking the photoresist pattern 60 as a shielding layer to form a plurality of metal wires 231 arranged side by side in the metal wire grid layer 230 and form a plurality of inorganic wires 241 arranged side by side in the second inorganic layer 240 corresponding to the plurality of photoresist strips 610 respectively, and removing the photoresist pattern 60. The substrate 210, the metal wire grid layer 230, and the first inorganic protective layer and the second inorganic protective layer disposed on opposite sides of the metal wire grid layer 230 are together to form the built-in polarizer 20.

Figure 7:
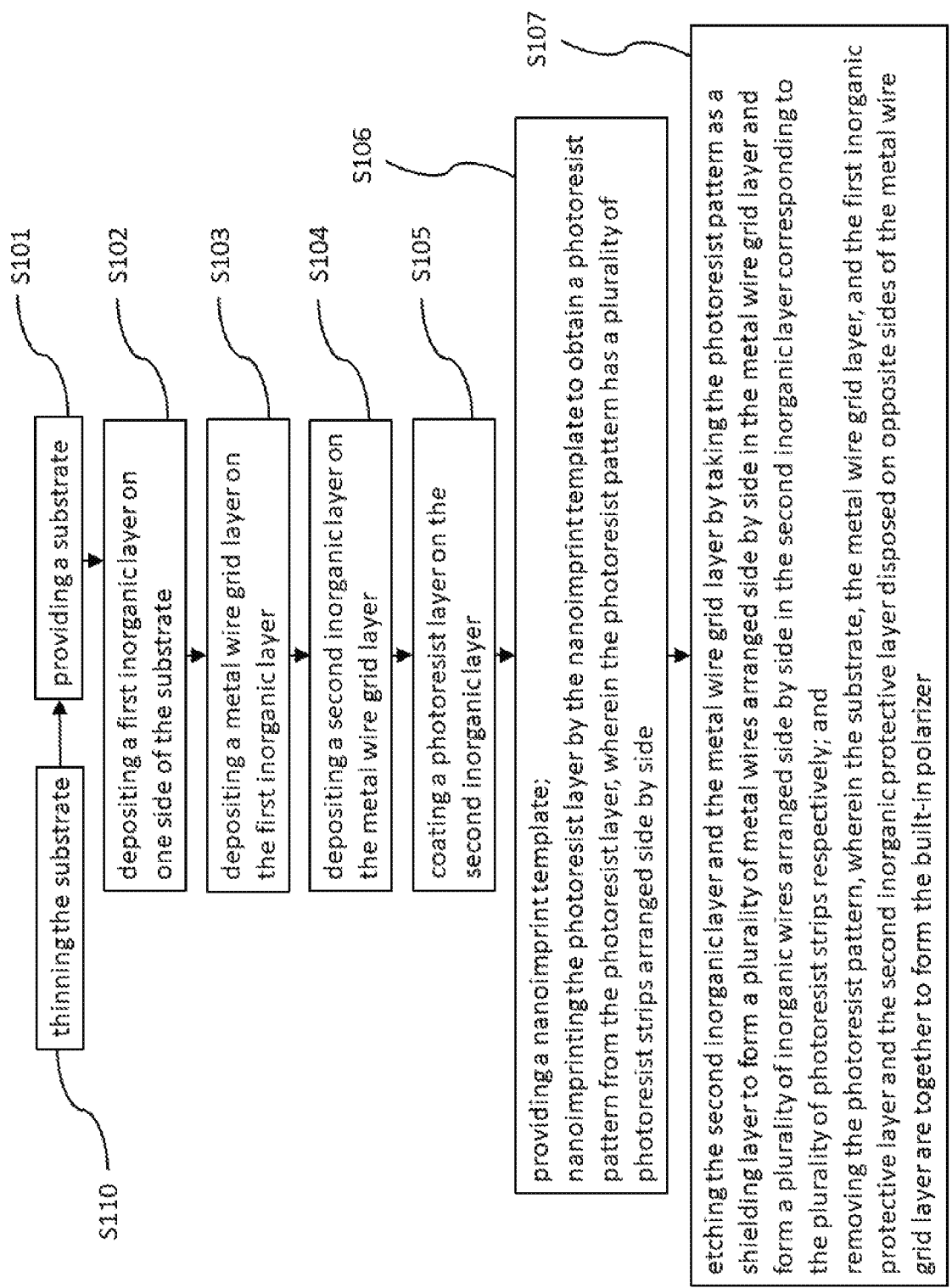
FIG. 7 is a schematic view of a flow chart of a method of manufacturing a built-in polarizer according to an embodiment of the disclosure.
Figure 8:
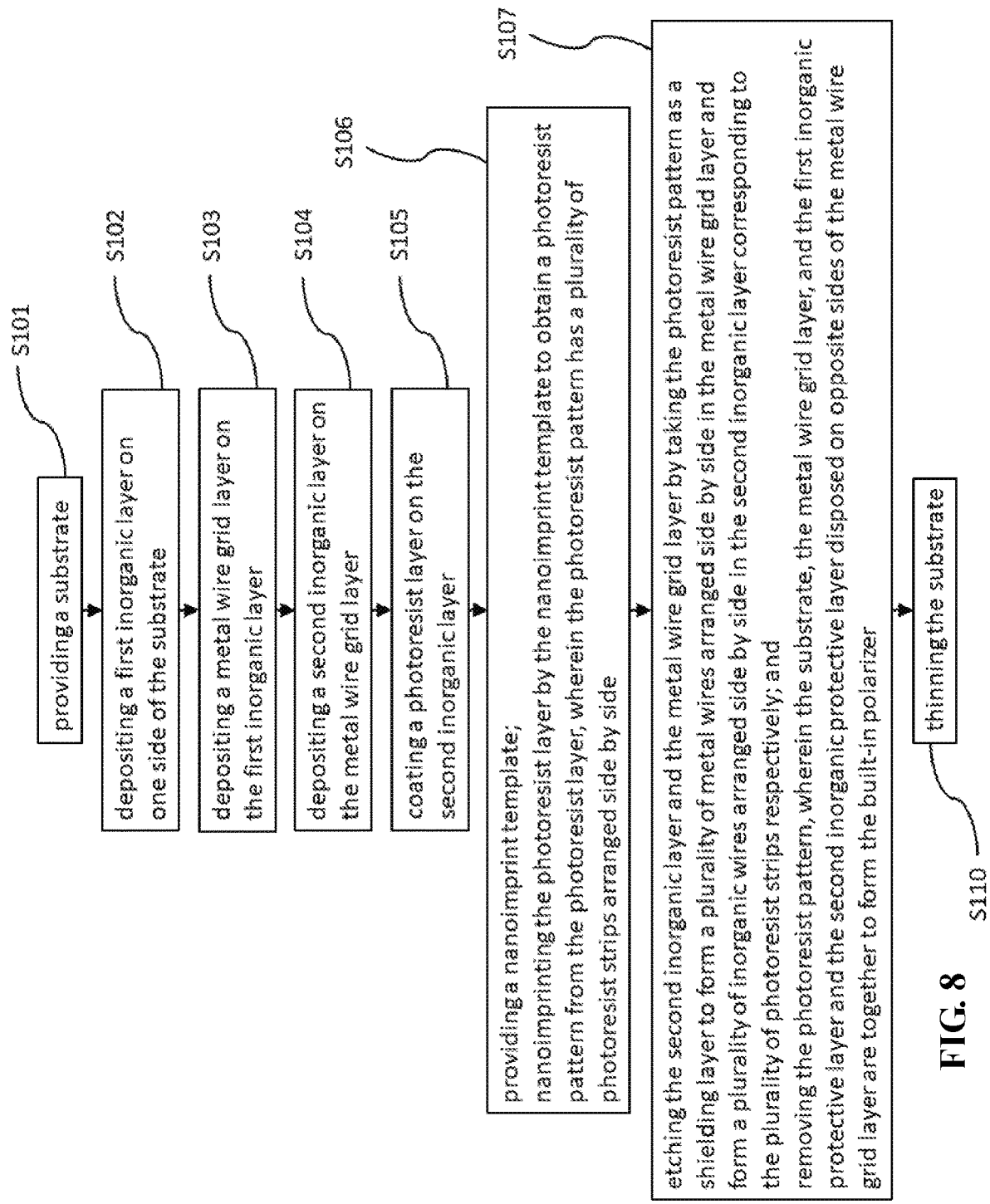
FIG. 8 is a schematic view of a flow chart of a method of manufacturing a built-in polarizer according to another embodiment of the disclosure.

Referring to FIGS. 7 and 8, the step S10 that providing the built-in polarizer further includes a step S110 of thinning the substrate so that the thickness of the substrate is between 0.1 mm and 1 mm Step of thinning the substrate may before the step of providing a substrate 210, or after the step S107.

Step S20 is providing an array substrate 50, and assembling the array substrate 50 and the built-in polarizer 20. In general, a common array substrate 50 includes a barrier layer, an active layer, a first gate insulating layer, a first gate layer, a second gate insulating layer, a second gate layer, a dielectric layer, an anode, a pixel defining layer, a luminescent layer, and the like in order from top to bottom. In detail, the second inorganic layer 240 of the built-in polarizer 20 facing the luminescent layer of the array substrate 50. The step S20 includes forming a spacer layer 40 on a side of the built-in polarizer 20 facing the array substrate 50.

Step S30 is providing a color filter substrate 10 disposed on the substrate 210 of the built-in polarizer 20. In detail, step S30 is providing a color filter substrate 10 disposed on a side of the substrate 210 of the built-in polarizer 20 opposite another side of the substrate 210 facing the first inorganic layer 220. Step S30 includes providing a black matrix layer 110 and a quantum dot color filter 120 on a side of the substrate 210 opposite another side of the substrate 210 facing the first inorganic layer 220, and forming an encapsulation layer 130 on the quantum dot color filter. Transmittance to water vapor and oxygen of the encapsulation layer 130 is less than $1 \times 10^{-2}$. At the same time, the encapsulation layer 130 has a certain hardness to protect the quantum dot color filter 120. Generally, material used for the encapsulation layer 130 may be polyvinylpyrrolidone or polymethyl methacrylate, and a thickness thereof is 0.5 μm or more.

Step S40 is filling liquid crystal between the color filter substrate 10 and the array substrate 50 to form a liquid crystal layer 30. In detail, the liquid crystal panel 1 is placed in a vacuum chamber, and then the liquid crystal panel 1 is evacuated. Liquid crystal is injecting into the liquid crystal panel by atmosphere pressure. The liquid crystal is a compound substance between a solid and a liquid, and has a characteristic of regular molecular arrangement.

The quantum dot color filter 120 in this embodiment is located on an outer layer. The encapsulation layer 130 can protect the quantum dot color filter 120.

In comparison with prior art, the liquid crystal panel and the method of manufacturing the same of the present disclosure reduce the difficulty of nanoimprinting by adding a glass substrate or a polyimide substrate and providing a metal wire grid layer on the substrate to form a built-in polarizer. The present disclosure changes a position of the built-in polarizer in the liquid crystal panel in prior art and provides a color filter substrate on a substrate of the built-in polarizer. The present disclosure reduces the difficulty of processes by providing the built-in polarizer before providing the color filter substrate. The present disclosure solves a problem that light beams from a quantum dot color film substrate cannot control to perform light on and off.

The present disclosure has been described by the above embodiments, but the embodiments are merely examples for implementing the present disclosure. It must be noted that the embodiments do not limit the scope of the invention. In contrast, modifications and equivalent arrangements are intended to be included within the scope of the invention.

What is claimed is:

1. A liquid crystal panel, comprising:
    a color filter substrate, comprising a quantum dot color filter and an encapsulation layer;
    an array substrate disposed opposite to the color filter substrate; and
    a built-in polarizer, comprising:
    a substrate covered a side of the color filter substrate facing the array substrate;
    a first inorganic layer covered the substrate;
    a metal wire grid layer covered the first inorganic layer, wherein the metal wire grid layer has a plurality of metal wires parallel to each other; and
    a second inorganic layer has a plurality of inorganic wires parallel to each other, wherein each of the inorganic wires correspondingly covers one of the metal wires;
    wherein the quantum dot color filter is disposed on a side of the substrate opposite another side of the substrate facing the first inorganic layer, and the encapsulation layer covers the quantum dot color filter, wherein transmittance to water vapor and oxygen of the encapsulation layer is less than $1\times10^{-2}$.

2. The liquid crystal panel according to claim 1, wherein the substrate is made of polyimide or glass, and the substrate has a thickness from 0.1 mm to 1 mm.

3. The liquid crystal panel according to claim 1, further comprising:
    a liquid crystal layer disposed between the array substrate and the color filter substrate; and
    a spacer layer disposed on a side of the built-in polarizer facing the array substrate.

4. The liquid crystal panel according to claim 1, wherein a height of the metal wire grid layer is from 180 nm to 250 nm, and a pitch between adjacent two of the metal wires is from 60 nm to 80 nm.

5. The liquid crystal panel according to claim 1, wherein material of the metal wire grid layer comprises at least one of aluminum, copper, silver, chromium, gold, and nickel, and material of the first inorganic layer and the second inorganic layer comprises at least one of silicon oxide, silicon nitride, aluminum oxide, silicon oxynitride, and hafnium oxide, respectively.

6. A method of manufacturing a liquid crystal panel, comprising steps of:
    providing a built-in polarizer, comprising steps of:
    providing a substrate;
    depositing a first inorganic layer on one side of the substrate;
    depositing a metal wire grid layer on the first inorganic layer;
    depositing a second inorganic layer on the metal wire grid layer;
    coating a photoresist layer on the second inorganic layer;
    providing a nanoimprint template;
    nanoimprinting the photoresist layer by the nanoimprint template to obtain a photoresist pattern from the photoresist layer, wherein the photoresist pattern has a plurality of photoresist strips arranged side by side;
    etching the second inorganic layer and the metal wire grid layer by taking the photoresist pattern as a shielding layer to form a plurality of metal wires arranged side by side in the metal wire grid layer and form a plurality of inorganic wires arranged side by side in the second inorganic layer corresponding to the plurality of photoresist strips respectively; and
    removing the photoresist pattern, wherein the substrate, the metal wire grid layer, and the first inorganic protective layer and the second inorganic protective layer disposed on opposite sides of the metal wire grid layer are together to form the built-in polarizer;
    providing an array substrate and assembling the array substrate and the built-in polarizer, wherein the second inorganic layer faces the array substrate;
    providing a color filter substrate disposed on the substrate of the built-in polarizer, wherein the step of providing the color filter substrate comprises:
    forming a quantum dot color filter on a side of the substrate opposite another side of the substrate facing the first inorganic layer; and
    forming an encapsulation layer on the quantum dot color filter, wherein transmittance to water vapor and oxygen of the encapsulation layer is less than $1\times10^{-2}$; and
    filling liquid crystal between the color filter substrate and the array substrate to form a liquid crystal layer after the step of providing the color filter substrate.

7. The method according to claim 6, wherein the step of providing the built-in polarizer further comprises a step of thinning the substrate so that the thickness of the substrate is between 0.1 mm and 1 mm.

8. The method according to claim 6, wherein the step of assembling the array substrate and the built-in polarizer comprises a step of forming a spacer layer on a side of the second inorganic layer facing the array substrate.

* * * * *